United States Patent [19]

Nakamaru et al.

[11] Patent Number: 5,354,622

[45] Date of Patent: Oct. 11, 1994

[54] MULTILAYERED SLIDING MEMBER

[75] Inventors: Takashi Nakamaru, Kanagawa; Tadashi Watai, Ayase; Akihiko Okimura, Yokohama; Sumihide Yanase, Ebina, all of Japan

[73] Assignee: Oiles Corporation, Tokyo, Japan

[21] Appl. No.: 99,482

[22] Filed: Jul. 28, 1993

[30] Foreign Application Priority Data

Jul. 30, 1992 [JP] Japan ................................. 4-245436

[51] Int. Cl.$^5$ ................................................. B22F 7/04
[52] U.S. Cl. .................................... 428/551; 428/549; 428/550; 428/553; 428/566; 428/567; 428/568
[58] Field of Search ............... 428/544, 550, 551, 553, 428/566, 567, 568; 423/554; 252/12, 12.2

[56] References Cited

U.S. PATENT DOCUMENTS

| | | | |
|---|---|---|---|
| 4,321,772 | 1/1982 | Mori | 252/12.2 |
| 4,394,275 | 7/1983 | Bickle et al. | 252/12 |
| 4,626,365 | 12/1986 | Mori | 252/12 |
| 4,655,944 | 4/1987 | Mori | 252/12.2 |
| 4,666,787 | 5/1987 | Bickle et al. | 428/550 |
| 4,732,818 | 3/1988 | Pratt et al. | 428/547 |
| 4,847,135 | 7/1989 | Braus et al. | 428/138 |
| 5,082,646 | 1/1992 | Ueno et al. | 423/554 |
| 5,128,213 | 7/1992 | Tanaka et al. | 428/552 |
| 5,300,366 | 4/1994 | Nakamaru et al. | 428/549 |

FOREIGN PATENT DOCUMENTS

| | | |
|---|---|---|
| 0456471A2 | 11/1991 | European Pat. Off. . |
| 1817113 | 9/1970 | Fed. Rep. of Germany . |
| 39-16950 | 8/1964 | Japan . |
| 2166142A | 4/1986 | United Kingdom . |

OTHER PUBLICATIONS

Hirai et al.; Chemical Abstracts, vol. 116, No. 22; "Synthetic Resin Compositions for Antiwear Sliding Parts"; Nov. 1991.

Furukawa et al.; Chemical Abstracts, vol. 108, No. 8, "Electrically Insulating Fluoro Rubbers with Fire and Tear Resistance and Flexibility"; Aug. 1987.

*Primary Examiner*—Donald P. Walsh
*Assistant Examiner*—John N. Greaves
*Attorney, Agent, or Firm*—Nixon & Vanderhye

[57] ABSTRACT

Disclosed herein is a multilayered sliding member comprising a lubricating composition comprising polytetrafluoroethylene and, as filler, 1–25 wt % of fibrous magnesium oxysulfate, fan-shaped magnesium oxysulfate or a mixture thereof, and a porous sintered metal layer formed on a steel backing, the lubrication composition being impregnated in and coated on a porous sintered metal layer formed on the steel backing.

10 Claims, No Drawings

MULTILAYERED SLIDING MEMBER

BACKGROUND OF THE INVENTION

The present invention relates to a multilayered sliding member having in the sliding surface thereof a lubricating composition mainly composed of polytetrafluoroethylene (hereinafter abbreviated as PTFE). More particularly, the present invention relates to a multilayered sliding member such as guide bush for shock absorber and bearing for hydraulic pump, which have in the sliding surface thereof a lubricating composition mainly composed of PTFE and exhibit excellent sliding characteristics in use in oil or under oil lubrication.

PTFE has been widely used as a starting material sliding members such as bearings for its peculiar characteristic properties such as excellent self-lubricating properties, low coefficient of friction, and high chemical and heat resistance.

However, a sliding member made of PTFE alone is poor in wear resistance and creep resistance. To overcome this problem, several measures have been taken according to the purpose of use of the sliding members, such as (1) blending a filler such as graphite, molybdenum disulfide, glass fiber, etc., to PTFE, and (2) impregnating and coating a lubricating composition in and on a porous sintered metal layer deposited integrally on a thin steel plate.

A sliding member concerning the above-mentioned (2) is proposed in JP-B-39-16950. This JP-B-39-16950 discloses a bearing material comprising a matrix composed of a porous copper or copper alloy layer which may be disposed on a steel backing, and a mixture of polytetrafluoroethylene and lead and/or an oxide thereof, which is impregnated at least at the exposed face of the porous copper or copper alloy layer, the amount of this mixture being not less than 28% in volume based on the matrix, and the amount of lead or lead and an oxide thereof being at least 16% in volume based on the matrix.

However, the conventional sliding members such as disclosed in the above, although are low in coefficient of friction and admirable in frictional properties, were not necessarily satisfactory in wear resistance. Also, the conventional sliding members had the problem that in use in oil, particularly in a state of high-speed sliding, the sliding surface was prone to damage by cavitation caused in such sliding, promoting abrasion of the sliding member.

As a result of the present inventors' earnest studies for overcoming the above prior art problems, it has been found that a multilayered sliding member obtained by scattering a wet lubricating composition comprising a mixture of polytetrafluoroethylene and 1-25 wt % of fibrous magnesium oxysulfate and/or fan-shaped magnesium oxysulfate, and a petroleum solvent on a porous sintered metal layer formed on a steel backing, rolling the resultant product by a roller so as to obtain a lubricating composition impregnated in and coated on the sintered metal layer, followed by heating to evaporate away the petroleum solvent in the lubricant composition, and then baking the resulting product by heating at a temperature of 360°-380° C., shows a low and stable coefficient of friction under oil lubrication, and also exhibits excellent wear-resistant and anti-cavitation properties. The present invention has been attained on the basis of this finding.

SUMMARY OF THE INVENTION

It is an object of the present invention to provide a multilayered sliding member having excellent friction and wear-resistant properties and also showing excellent anti-cavitation properties in use in oil in a state of high-speed sliding.

In a first aspect of the present invention, there is provided a multilayered sliding member comprising a lubricating composition comprising polytetrafluoroethylene and 1-25 wt % of fibrous magnesium oxysulfate, fan-shaped magnesium oxysulfate or a mixture thereof used as a filler; and a porous sintered metal layer formed on a steel backing, the lubricating composition being impregnated in and coated on the porous sintered metal layer formed on a steel backing.

In a second aspect of the present invention, there is provided a multilayered sliding member comprising a lubricating composition comprising polytetrafluoroethylene, 1-25 wt % of fibrous magnesium oxysulfate, fan-shaped magnesium oxysulfate or a mixture thereof as a first filler, and 1-20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as a second filler, the total amount of the first and second fillers in the composition being not more than 30 wt %; and a porous sintered metal layer formed on a steel backing, the lubricating composition being impregnated in and coated on the porous sintered metal layer formed on a steel backing.

DETAIL DESCRIPTION OF THE INVENTION

The backing used in the present invention is a thin metal plate. Usually a thin plate of structural rolled steel is used, but other types of thin steel plate or thin plates of other metals than steel can be used according to the purpose of use of the sliding member produced. The above thin metal plates subjected to a specific treatment such as copper plating for improving corrosion resistance are also usable.

The porous sintered metal layer formed integrally on the backing in the present invention is usually composed of a copper alloy with excellent friction abrasion properties, such as bronze, leaded bronze, phosphor bronze, etc. But it is possible to use other substances than copper alloys, such as aluminum alloy, iron, etc., according to the purpose of use of the sliding member. The powder shape of these alloys used in the present invention is preferably spherical or an irregular particle-form such as granular.

The porosity of the porous sintered metal layer used in the present invention is not less than 25%, preferably 28 to 35%. The sintered metal layer having a porosity in the above-defined range can be obtained by sintering a metal powder of a particle size which can pass a 80-mesh screen but can not pass a 350-mesh screen.

As PTFE constituting the main component of the lubricating composition of the present invention, there is usually used a fine powder (e.g. "Teflon 6CJ", produced by Mitsui Du Pont Fluorochemical Co., Ltd.; "Polyflon F201", produced by Daikin Industries, Ltd.; and "Fluon CD-076, CD-126 and CD-4", produced by Asahi Glass Co., Ltd.). It is also possible to use a powder obtained by mixing in the fine powder with a molding powder (e.g. "Teflon 7AJ", produced by Mitsui Du Pont Fluorochemical Co., Ltd.) in an amount of the molding powder of not more than 20 wt % based on the lubricating composition. The content of PTFE in the lubricating composition is in the range of 50 to 99 wt % preferably 65 to 85 wt %.

The magnesium oxysulfate used as a first filler for the main component PTFE of the lubricating composition of the present invention is a basic magnesium sulfate hydrate represented by the chemical formula: $MgSO_4 \cdot 5MgO \cdot 8H_2O$ or $MgSO_4 \cdot 5Mg(OH)_2 \cdot 3H_2O$. This magnesium oxysulfate is assumed the roles of supplying the defect of PTFE, which is poor in the wear resistance, elevating retainability of the oil film in use in oil or under oil lubrication, while bettering the anti-cavitation properties and improving dispersibility of the other filler.

As the magnesium oxysulfate, there can be used the fibrous type and the fan-shaped type. The fan-shaped type is composed of the crystals grown to a fan-like configuration comprising the acicular crystals bundled together (refer to photograph 3 in "The Properties and Applications of Fibrous Magnesium Hydroxide Sulfate Hydrate 'MOS-HIGE'", Annal. High Perform. Paper Soc., No. 27, November, 1988, pp. 26-31). In view of dispersibility in PTFE and processability in impregnation and coating of the lubricating composition in and on the porous sintered metal layer, use of fan-shaped magnesium oxysulfate is preferred.

This magnesium oxysulfate contains crystal water as noticed from the above chemical formula, so that when this compound is blended as it is in PTFE to form a lubricating composition, there could take place release of crystal water in the course of baking of the lubricating composition depending on the quantity of the compound blended, and such release of crystal water may cause formation of pinholes in the sliding surface. These pinholes, although giving no adverse effect to the sliding properties, may cause a reduction of adhesiveness of the lubricating composition to the sintered metal layer, so that it is preferable to heat-treat the magnesium oxysulfate at a temperature of 300°-500° C. so as to have the crystal water released before this compound is blended in PTFE.

The magnesium oxysulfate used in the present invention is preferably fibrous crystal-type or fan-shaped crystal-type (with acicular crystals bundled together) having an average length (major axis diameter) of 1 to 1,000 μm, preferably 10 to 200 μm, an average diameter (minor axis diameter) of 0.1 to 10 μm, preferably 0.1 to 1 μm, and an aspect ratio (average major axis diameter/average minor axis diameter) of 10 to 200, preferably 10 to 100. A typical example of such magnesium oxysulfate is "MOS-HIGE", produced by Ube Industries, Ltd.

The content of magnesium oxysulfate in the lubricating composition is 1 to 25 wt %, preferably 10 to 15 wt %. When its content is less than 1 wt %, it is unable to impart a lubricating composition with desired wear resistance, anti-cavitation properties and oil film retainability. When the content exceeds 25 wt %, workability of the composition may be deteriorated.

In order to further enhance wear resistance and oil film retainability of the lubricating composition comprising PTFE and magnesium oxysulfate, there may be added, in addition to the magnesium oxysulfate (first filler), at least one compound selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as a second filler. Among these compounds, magnesium oxide, magnesium hydroxide, magnesium silicate, fluorine-contained mica and zinc oxide are preferred for the purpose of further enhancing oil-film retainability of the lubricating composition.

These second filler compounds have an oil adsorbing property, and when the sliding member is in use in oil or under oil lubrication, they function to adsorb oil on the sliding surface to encourage formation of an oil film on the sliding surface, while securing retention of the oil film on the sliding surface. Thus, blending of the second filler contributes to formation of an always stable lubricating oil-film on the sliding surface and allows the produced sliding member to exhibit the excellent sliding characteristics under oil lubrication.

The average particle size of the second filler is not greater than 20 μm, preferably 1 to 10 μm.

The effect of blending of the second filler becomes recognizable at the content of 1 wt % and is maintained until the content of 20 wt %. However, when its content exceeds 20 wt %, although the oil film forming and oil film retaining properties are maintained, adverse effect is given to workability of the sliding member. Therefore, the content of the second filler in the lubricating composition is not more than 20 wt %, preferably 1 to 15 wt %, more preferably 5 to 10 wt %. It should, however, be decided in accord with the blending ratio of the first filler (magnesium oxysulfate).

It is to be noted that, in the present invention, when the total content of the first filler (magnesium oxysulfate) and the second filler exceeds 30 wt %, adverse effect is given to workability of the lubricating composition such as expansibility, and impregnation and coating characteristics for the porous sintered metal layer. Therefore, the total content of the first and second fillers in the composition is not more than 30 wt %, preferably 10 to 28 wt %, more preferably 15 to 25 wt %.

In the lubricating composition composed of (1) PTFE and first filler, or (2) PTFE, first filler and second filler, other fluorine resin(s) than PTFE may be blended for the purpose of further improving wear resistance and anti-cavitation properties.

Examples of such fluorine resins are tetrafluoroethylene-perfluoroalkylvinyl ether copolymer (hereinafter referred to as PFA), tetrafluoroethylenehexafluoropropylene copolymer (hereinafter referred to as FEP), tetrafluoroethylene-ethylene copolymer (hereinafter referred to as ETFE), polychlorotrifluoroethylene (hereinafter referred to as PCTFE), chlorotrifluoroethyleneethylene copolymer (hereinafter referred to as ECTFE), polyvinylidene fluoride (hereinafter referred to as PVDF) and polyvinyl fluoride (hereinafter referred to as PVF).

The content of fluorine resin in the composition is preferably not more than 30 wt %, more preferably in the range of 0.1 to 20 wt % based on the composition. If the content exceeds 30 wt %, the sliding properties deteriorate, and especially coefficient of friction are elevated, resulting in reducing the sliding stability.

Further, in the lubricating composition of the present invention composed of (1) PTFE and first filler, (2) PTFE, first filler and second filler, or (3) PTFE, first filler, and fluorine resin, (4) PTFE, first filler, second filler and fluorine resin, there may be blended at least one selected from the group consisting of lead, zinc, tin, copper and alloys thereof as a metallic filler for further improving sliding stability and wear resistance.

The metallic filler used in the present invention is preferably a powder having an average particle size of 40 to 80 µm, and the content thereof in the composition is preferably not more than 20 wt %, more preferably 0.1 to 15 wt %.

The composition of the lubricating composition of the present invention may be exemplified as follows.

(1) A lubricating composition comprises 75 to 99 wt % of polytetrafluoroethylene; and 1–25 wt % of fibrous magnesium oxysulfate, fan-shaped magnesium oxysulfate or a mixture thereof.

(2) A lubricating composition comprises 70 to 98 wt % of polytetrafluoroethylene; 1–25 wt % of fibrous magnesium oxysulfate, fan-shaped magnesium oxysulfate or a mixture thereof as first filler; and 1–20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as second filler, the total content of the first and second fillers in the composition being not more than 30 wt %.

(3) A lubricating composition comprises 50 to 99 wt % of polytetrafluoroethylene; 1–25 wt % of fibrous magnesium oxysulfate, fan-shaped magnesium oxysulfate or a mixture thereof; and not more than 30 wt % of a fluorine resin selected from the group consisting of tetrafluoroethyleneperfluoroalkylvinyl ether copolymer, tetrafluoroethylenehexafluoropropylene copolymer, tetrafluoroethylene-ethylene copolymer, polychlorotrifluoroethylene, chlorotrifluoroethylene-ethylene copolymer, polyvinylidene fluoride and polyvinyl fluoride.

(4) A lubricating composition comprises 50 to 98 wt % of polytetrafluoroethylene; 1–25 wt % of fibrous magnesium oxysulfate, fan-shaped magnesium oxysulfate or a mixture thereof as first filler; 1–20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as second filler, the total content of the first and second fillers in the composition being not more than 30 wt %; and not more than 30 wt % of a fluorine resin selected from the group consisting of tetrafluoroethylene-perfluoroalkylvinyl ether copolymer, tetrafluoroethylene-hexafluoropropylene copolymer, tetrafluoroethylene-ethylene copolymer, polychlorotrifluoroethylene, chlorotrifluoroethylene-ethylene copolymer, polyvinylidene fluoride and polyvinyl fluoride.

(5) A lubricating composition comprises 75 to 99 wt % of polytetrafluoroethylene; 1–25 wt % of fibrous magnesium oxysulfate, fan-shaped magnesium oxysulfate or a mixture thereof; and not more than 20 wt % of at least one metallic filler selected from the group consisting of lead, zinc, tin, copper and an alloy thereof.

(6) A lubricating composition comprises 70 to 98 wt % of polytetrafluoroethylene; 1–25 wt % of fibrous magnesium oxysulfate, fan-shaped magnesium oxysulfate or a mixture thereof as first filler; 1–20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as second filler, the total content of the first and second fillers in the composition being not more than 30 wt %; and not more than 20 wt % of at least one metallic filler selected from the group consisting of lead, zinc, tin, copper and an alloy thereof.

(7) A lubricating composition comprises 50 to 99 wt % of polytetrafluoroethylene; 1–25 wt % of fibrous magnesium oxysulfate, fan-shaped magnesium oxysulfate or a mixture thereof; not more than 30 wt % of a fluorine resin selected from the group consisting of tetrafluoroethyleneperfluoroalkylvinyl ether copolymer, tetrafluoroethylenehexafluoropropylene copolymer, tetrafluoroethylene-ethylene copolymer, polychlorotrifluoroethylene, chlorotrifluoroethylene-ethylene copolymer, polyvinylidene fluoride and polyvinyl fluoride; and not more than 20 wt % of at least one metallic filler selected from the group consisting of lead, zinc, tin, copper and an alloy thereof.

(8) A lubricating composition comprises 50 to 98 wt % of polytetrafluoroethylene; 1–25 wt % of fibrous magnesium oxysulfate, fan-shaped magnesium oxysulfate or a mixture thereof as first filler; 1–20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as second filler, the total content of the first and second fillers in the composition being not more than 30 wt %; not more than 30 wt % of a fluorine resin selected from the group consisting of tetrafluoroethylene-perfluoroalkylvinyl ether copolymer, tetrafluoroethylene-hexafluoropropylene copolymer, tetrafluoroethylene-ethylene copolymer, polychlorotrifluoroethylene, chlorotrifluoroethylene-ethylene copolymer, polyvinylidene fluoride and polyvinyl fluoride; and not more than 20 wt % of at least one metallic filler selected from the group consisting of lead, zinc, tin, copper and an alloy thereof.

In the present invention, it is also possible to blend in the lubricating composition other filler(s) commonly used for improving wear resistance of PTFE, for example, solid lubricant such as graphite, molybdenum disulfide, boron nitride and the like in an amount not exceeding 10 wt %, as well as those generally used for reinforcement, for example, fiber reinforcement such as carbon fiber, glass fiber, aramide fiber and the like in an amount not exceeding 10 wt %.

The process for producing a sliding member according to the present invention is described below.

Preparation of lubricating composition

A PTFE powder, 1–25 wt % of first filler, not more than 20 wt % of second filler, not more than 30 wt % of fluorine resin and not more than 20 wt % of metallic filler are mixed while pulverizing at a temperature not more than the transition point (19° C.) of PTFE, preferably at 10° to 18° C. To the resultant mixture maintained at a temperature not more than 19° C., preferably at 10° to 18° C., a petroleum solvent is added in an amount of 15–30 parts by weight to 100 parts by weight of the mixture, followed by mixing with stirring to obtain a wet lubricating composition.

The petroleum solvents usable here include naphtha, toluene, xylene, aliphatic solvents, aliphatics and naphthenics mixed-solvents.

When the mixing ratio of the petroleum solvent in the wet lubricating composition is less than 15 parts by weight based on 100 parts by weight of the mixture, the expansibility of the lubricating composition in the step of impregnation and coating for the porous sintered metal layer described later become bad, and impregnation and coating thereof tend to become non-uniform. On the other hand, when the mixing ratio of the petroleum solvent exceeds 30 parts by weight based on 100 parts by weight of the mixture, not only the impregnation and coating operation becomes difficult to perform, but also the coating thickness tends to become non-uniform or the adhesive strength between the lubricating composition and the sintered layer may be lowered.

By mixing at a temperature below the transition point of PTFE, it is possible to prevent fibrization of PTFE and to obtain a homogenous mixture.

Production of sliding member (a) A wet lubricating composition having wettability is scattered on a porous sintered metal layer formed on a metallic backing and is rolled by a roller so as to obtain the composition impregnated in the sintered layer while forming a uniform coat of the composition on the surface of the sintered layer. In this step, the wet lubricating composition is coated to a thickness of 2 to 2.5 times the coating thickness required in the final product. Filling of the voids in the porous sintered metal layer with wet lubricating composition is substantially completed in this step.

(b) The backing having the porous sintered metal layer impregnated and coated with the wet lubricating composition is kept in a drying oven heated at a temperature 200°–250° C. for a few minutes to let the petroleum solvent disperse away, and then the dried lubricating composition is rolled down to a prescribed thickness by a pressure roll under a pressure of roughly 300–600 kg/cm$^2$.

(c) Then the backing having the rolled dry lubricating composition layer is placed in a heating oven heated at a temperature of 360°–380° C. for several to ten and several minutes, and thereafter the baked product is taken out of the oven and again passed under the roll to adjust dimensional variation.

(d) After dimensional adjustment, the backing having the sliding surface layer formed thereon is cooled and, if necessary, passed between the correcting rolls for correcting undulation and/or other deformation of the backing, thereby finally obtaining a desired multilayered sliding member.

This multilayered sliding member, in the form of a flat plate, may be cut to a suitable size for use as a sliding plate, or it may be bent roundly to form a cylindrical spiral bush.

The thickness of the porous sintered metal layer in the multilayered sliding member according to the present invention is 0.1 to 0.35 mm, and the thickness of the sliding surface layer formed from the above-described lubricating composition is 0.02 to 0.15 mm.

The coefficient of friction of the multilayered sliding member of the present invention, as determined in a Thrust test conducted under the conditions of sliding speed of 10 m/min, loading of 40 kgf/cm$^2$ and testing time of 8 hours, is 0.01 to 0.09, preferably 0.01 to 0.06, and the abrasion amount in the above test is not more than 40 μm, preferably not more than 30 μm, more preferably not more than 20 μm.

Also, the coefficient of friction of the present sliding member, as determined in a Radial Journal test conducted in a high-temperature (100° C.) oil (ATF-DII, produced by Idemitsu Sekiyu Co., Ltd.) under the conditions of sliding speed of 8.05 m/min, loading of 363.6 kgf/m and testing time of 5 hours, is 0.01 to 0.02, preferably 0.01 to 0.015, and the abrasion amount in such test sliding is not more than 40 μm, preferably not more than 30 μm, more preferably not more than 25 μm.

The lubricating composition impregnated in and coated on a porous sintered metal layer formed on a backing according to the present invention shows a low and stable coefficient of friction, and also exhibits excellent wear-resistant properties and anti-cavitation properties, especially under oil lubrication or in high-temperature oil.

EXAMPLES

The present invention is described in further detail below with reference to the examples thereof. These examples, however, are not to be taken as limiting the scope of the invention in any way.

Examples and Comparative Examples

A PTFE powder (Teflon 6CJ, produced by Mitsui Du Pont Fluorochemical Co., Ltd.; average particle diameter: not more than 80 μm) and a filler(s) shown in Table 1 were pulverized and mixed by a Henschel mixer. In the resulting mixed powder was blended an aliphatic/naphthenic mixed solvent in an amount of 20 parts by weight to 100 parts by weight of the mixed powder, and they were mixed at a temperature not more than the transition point of the PTFE to obtain a wet lubricating composition. This wet lubricating composition was scattered on a porous sintered metal layer (thickness:0.25 mm) formed on a thin steel backing plate (thickness: 0.70 mm) and was rolled down to a coating thickness of 0.25 mm to form a multilayered plate. This multilayered plate was kept in a 200° C. hot-air drying oven for 5 minutes to evaporate away the solvent, and then the dried lubricating composition layer was pressed down to a thickness of 0.10 mm by a roller under the pressure of 400 kg/cm$^2$.

The pressed multilayered plate was placed in a heating-oven heated, and baked at a temperature of 370° C. for 10 minutes and then again pressed by a roller. After dimensional adjustment and correction of deformation such as undulation, the plate was cut into a 30 mm×30 mm×1.05 mm (in thickness) plate-like sliding member sample.

Friction abrasion test I

Each of the sliding member samples obtained in the manner described above in the Examples and the Comparative Examples was subjected to a thrust test (I) under the following conditions to determine their friction abrasion properties.

| Sliding conditions: | |
| --- | --- |
| Sliding speed | 10 m/min |
| Loading | 40 kgf/cm$^2$ |
| Testing time | 8 hours |
| Lubricant | Initial application of ATF-D II (produced by Idemitsu Sekiyu Co., Ltd.) |
| Mating member | Carbon steel for machine structure use (S45C) |

Regarding coefficient of friction, the value of coefficient of friction during the test period after one hour from start of the test was shown, and as for abrasion amount, the amount of dimensional change of the sliding surface after the 8-hour test period was measured.

The frictional amount properties of the respective sliding member samples are shown in Table 1.

TABLE 1

|  | PTFE | Magnesium oxysulfate | Second filler | Fluorine resin | Metallic filler | Coefficient of friction | Abrasion amount ($\mu$m) |
|---|---|---|---|---|---|---|---|
| Examples |  |  |  |  |  |  |  |
| 1 | 95 | Fibrous 5 | — | — | — | 0.02–0.04 | 30.6 |
| 2 | 90 | Fibrous 10 | — | — | — | 0.02–0.05 | 32.7 |
| 3 | 85 | Fan-shaped 15 | — | — | — | 0.03–0.06 | 36.8 |
| 4 | 80 | Fan-shaped 20 | — | — | — | 0.03–0.06 | 31.3 |
| 5 | 90 | Fibrous 5 | $MgCO_3$ 5 | — | — | 0.03–0.07 | 28.4 |
| 6 | 85 | Fibrous 5 | $Mg(OH)_2$ 10 | — | — | 0.02–0.06 | 25.2 |
| 7 | 85 | Fan-shaped 10 | MgO 5 | — | — | 0.02–0.04 | 16.0 |
| 8 | 80 | Fibrous 10 | ZnO 10 | — | — | 0.02–0.04 | 11.9 |
| 9 | 75 | Fan-shaped 10 | ZnS 15 | — | — | 0.02–0.05 | 27.7 |
| 10 | 70 | Fan-shaped 10 | ZnO 20 | — | — | 0.02–0.04 | 16.8 |
| 11 | 80 | Fan-shaped 15 | ZnO 5 | — | — | 0.02–0.03 | 13.6 |
| 12 | 70 | Fan-shaped 15 | ZnO 15 | — | — | 0.03–0.04 | 15.8 |
| 13 | 75 | Fan-shaped 20 | ZnO 5 | — | — | 0.03–0.05 | 29.6 |
| 14 | 70 | Fan-shaped 20 | ZnO 10 | — | — | 0.03–0.05 | 29.3 |
| 15 | 75 | Fan-shaped 10 | $BaSO_4$ 15 | — | — | 0.02–0.06 | 29.5 |
| 16 | 80 | Fan-shaped 10 | $CaF_2$ 10 | — | — | 0.03–0.08 | 28.7 |
| 17 | 75 | Fan-shaped 5 | MgO 10 | PFA 10 | — | 0.02–0.04 | 18.4 |
| 18 | 75 | Fan-shaped 5 | MgO 10 | — | Pb 10 | 0.02–0.04 | 23.3 |
| 19 | 65 | Fan-shaped 5 | ZnO 10 | PFA 10 | Zn 10 | 0.03–0.06 | 22.7 |
| 20 | 90 | Fan-shaped 10 | — | — | — | 0.02–0.04 | 32.6 |
| 21 | 80 | Fan-shaped 10 | — | PFA 10 | — | 0.02–0.05 | 24.2 |
| 22 | 80 | Fan-shaped 10 | — | — | Zn 10 | 0.03–0.06 | 30.1 |
| 23 | 80 | Fan-shaped 10 | — | PFA 5 | Zn 5 | 0.02–0.06 | 27.2 |
| Comp. Examples |  |  |  |  |  |  |  |
| 1 | 90 | — | ZnO 10 | — | — | 0.02–0.08 | 57.6 |
| 2 | 85 | — | $BaSO_4$ 15 | — | — | 0.02–0.12 | 68.4 |
| 3 | 50 | — | — | — | Pb 50 | 0.03–0.09 | 73.5 |

(Note) The terms "Fibrous" and "Fan-shaped" in the column of 'Magnesium oxysulfate' in the above Table signify that fibrous magnesium oxysulfate and fan-shaped magnesium oxysulfate were used, respectively. Also in the above Table, the amounts of PTFE, magnesium oxysulfate(first filler), second filler, fluorine resin and metallic filler are shown "by wt %".

The test results show that the sliding member samples according to the Examples of the present invention were low in coefficient of friction and maintained a stable performance through the test period, and they were also very small in abrasion amount measured after the test.

On the other hand, the sliding member samples according to the Comparative Examples were rather unstable in coefficient of friction and suffered much abrasion wear in the test, posing a problem on durability.

Friction abrasion test II

A thrust test (II) was similarly conducted in oil under the same conditions as used in the thrust test (I) except that the sliding speed was changed to 40 m/min and loading to 10 gf/cm$^2$. As a result, the sliding member sample prepared by blending 10 wt % of fan-shaped magnesium oxysulfate to PTFE (Example 20) had abrasion amount of 30.4 $\mu$m, while the sample prepared by blending 10 wt % of fan-shaped magnesium oxysulfate and 10 wt % of zinc oxide to PTFE (Example 8) had abrasion amount of only 8.3 $\mu$m, which indicates excellent wear resistance of these samples. Also, no exfoliation of the bearing surface layer was observed.

Thus, the sliding member samples according to the present invention had no influence of cavitation, were very small in abrasion amount and showed stable sliding properties even under a high-speed sliding condition.

Friction abrasion test III

The friction abrasion properties of the sliding member samples of Examples shown in Table 1 were determined from the following tests.

(1) Thrust test III

| Sliding conditions: | |
|---|---|
| Sliding speed | 10 m/min |
| Loading | 80 kgf/cm$^2$ |
| Testing time | 8 hours |
| Lubricant | Initial application of ATF-D II, produced by Idemitsu Sekiyu Co., Ltd. |
| Mating member | Stainless steel (SUS 304) |

Regarding coefficient of friction, the value of coefficient of friction during the test period after one hour from start of the test was shown. As for abrasion amount, the amount of dimensional change of the sliding surface after 8-hour test period was measured. The results are shown in Table 2.

(2) Radial Journal test in high-temperature oil

| Sliding conditions: | |
|---|---|
| Sliding speed (rotational speed) | 8.05 m/min |
| Loading | 363.6 kgf/cm$^2$ |
| Testing time | 5 hours |
| Lubricant | In high-temperature (100° C.) oil (ATF-DII, produced by Idemitsu Sekiyu Co., Ltd.) |
| Mating member | Cr—Mo-steel (SCM 415 H) |

Regarding coefficient of friction, the value of coefficient of friction during the test period after one hour from start of the test was shown. As for abrasion amount, the amount of dimensional change of the sliding surface after 5-hour test period was measured. The results are shown in Table 2.

TABLE 2

| | Thrust test (III) | | Radial Journal test in high-temperature oil | |
|---|---|---|---|---|
| Example No. | Coefficient of friction | Abrasion amount (μm) | Coefficient of friction | Abrasion amount (μm) |
| Example 7 | 0.01–0.03 | 18.3 | 0.010–0.014 | 25 |
| Example 8 | 0.01–0.04 | 14.8 | 0.010–0.015 | 22 |
| Example 11 | 0.01–0.02 | 14.0 | 0.012–0.015 | 18 |
| Example 17 | 0.01–0.03 | 19.7 | 0.010–0.012 | 28 |
| Example 18 | 0.02–0.04 | 25.5 | 0.010–0.020 | 38 |
| Comparative Example 3 | 0.03–0.09 | 76.9 | 0.012–0.077 | 85 |

As seen from the test results, the sliding member samples according to the present invention showed a stable performance with a low coefficient of friction maintained through the test time. Abrasion amount of these samples measured after the test was also very small.

What is claimed is:

1. A multilayered sliding member comprising a lubricating composition comprising polytetrafluoroethylene and, as filler, 1–25 wt % of fibrous magnesium oxysulfate, fan-shaped magnesium oxysulfate or a mixture thereof, and a porous sintered metal layer formed on a steel backing, the lubrication composition being impregnated in and coated on a porous sintered metal layer formed.

2. A multilayered sliding member according to claim 1, wherein the lubricating composition comprises polytetrafluoroethylene, 1–25 wt % of fibrous magnesium oxysulfate, fan-shaped magnesium oxysulfate or a mixture thereof as first filler, and 1–20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as second filler, the total content of the first and second fillers in the composition being not more than 30 wt %.

3. A multilayered sliding member according to claim 1, wherein the lubricating composition contains not mote than 30 wt % of a fluorine resin other than polytetrafluoroethylene.

4. A multilayered sliding member according to claim 1, wherein the lubricating composition contains, as a metallic filler, not more than 20 wt % of at least one member selected from the group consisting of lead, zinc, tin, copper and alloys thereof.

5. A multilayered sliding member according to claim 1, wherein the fibrous or fan-shaped magnesium oxysulfate is magnesium oxysulfate obtained by heat-treating at a temperature of 300° to 500° C.

6. A multilayered sliding member according to claim 1, wherein the fibrous magnesium oxysulfate has an average major axis diameter of 1 to 1,000 μm, an average minor axis diameter of 0.1 to 10 μm and an aspect ratio of 10 to 200.

7. A multilayered sliding member according to claim 1, wherein the fan-shaped magnesium oxysulfate has an average major axis diameter of 10 to 200 μm, an average minor axis diameter of 0.1 to 1.0 μm and an aspect ratio of 10 to 100.

8. A multilayered sliding member according to claim 2, wherein the average particle diameter of the second filler is not more than 20 μm.

9. A multilayered sliding member according to claim 3, wherein the fluorine resin is tetrafluoroethyleneperfluoroalkylvinyl ether copolymer, tetrafluoroethylenehexafluoropropylene copolymer, tetrafluoroethylene-ethylene copolymer, polychlorotrifluoroethylene, chlorotrifluoroethylene-ethylene copolymer, polyvinylidene fluoride and polyvinyl fluoride.

10. A multilayered sliding member according to claim 4, wherein the average particle diameter of the metallic filler is 40 to 80 μm.

* * * * *